United States Patent
Jax et al.

(10) Patent No.: US 8,995,348 B2
(45) Date of Patent: *Mar. 31, 2015

(54) METHOD AND APPARATUS FOR SYNCHRONIZING HIGHLY COMPRESSED ENHANCEMENT LAYER DATA

(71) Applicant: Thomson Licensing, Issy de Moulineaux (FR)

(72) Inventors: Peter Jax, Hannover (DE); Sven Kordon, Wunstorf (DE)

(73) Assignee: Thomson Licensing, Issy de Moulineaux (FR)

( * ) Notice: Subject to any disclaimer, the term of this patent is extended or adjusted under 35 U.S.C. 154(b) by 74 days.

This patent is subject to a terminal disclaimer.

(21) Appl. No.: 13/845,290

(22) Filed: Mar. 18, 2013

(65) Prior Publication Data

US 2013/0215972 A1 Aug. 22, 2013

Related U.S. Application Data

(63) Continuation of application No. 12/737,408, filed on Jan. 11, 2011, now Pat. No. 8,462,702.

(30) Foreign Application Priority Data

Jul. 16, 2008 (EP) .................................. 08160549
Jul. 14, 2009 (WO) ................. PCT/EP2009/058944

(51) Int. Cl.
*H04W 4/00* (2009.01)
*H04J 3/16* (2006.01)
(Continued)

(52) U.S. Cl.
USPC ............ 370/328; 370/470; 370/474; 370/477

(58) Field of Classification Search
None
See application file for complete search history.

(56) References Cited

U.S. PATENT DOCUMENTS

6,363,119 B1 3/2002 Oami
7,188,250 B1 3/2007 Alfieri et al.
(Continued)

FOREIGN PATENT DOCUMENTS

GB 2391413 7/2002
RU 2316909 2/2008
(Continued)

OTHER PUBLICATIONS

Van Dyck et al., "Wavelet Video Transmission Over Wireless Channels", Signal Processing: Image Communication 12, 1992, pp. 135-145.

(Continued)

*Primary Examiner* — Faruk Hamza
*Assistant Examiner* — Diane Lo
(74) *Attorney, Agent, or Firm* — Robert D. Shedd; Paul P. Kiel; Xiaoan Lu (57) ABSTRACT

Multimedia application data formats often use data packets and may contain packetized hierarchical layers with a base layer (BL) and one or more enhancement layers (EL). Packets that comprise variable length coded data typically provide padding bits, which can be used for adding checksum information. The checksum information refers to both, the decoded base layer and decoded enhancement layer packet data, and is used for detecting synchronization loss between the layers. Though the packets provide different individual amounts of padding bits, this variable amount of bits per packet is sufficient for adding checksum information for synchronization related purposes. This allows e.g. out-of-sync detection even if the enhancement layer encoding provides no overhead information for synchronization, in particular no packet headers and no packet synchronization words.

2 Claims, 3 Drawing Sheets (51) Int. Cl.
*H04J 3/22* (2006.01)
*H04J 3/24* (2006.01)
*H04J 3/18* (2006.01)

(56) References Cited

U.S. PATENT DOCUMENTS

| | | |
|---|---|---|
| 2002/0021761 A1 | 2/2002 | Zhang et al. |
| 2005/0041745 A1 | 2/2005 | Zhang et al. |
| 2006/0025070 A1 | 2/2006 | Kim et al. |
| 2006/0039480 A1 | 2/2006 | Seo et al. |
| 2006/0088101 A1 | 4/2006 | Han et al. |
| 2007/0065005 A1 | 3/2007 | Cha et al. |
| 2007/0083363 A1 | 4/2007 | Kim et al. |
| 2007/0086516 A1 | 4/2007 | Lee et al. |
| 2008/0101476 A1 | 5/2008 | Tian et al. |
| 2008/0115040 A1 | 5/2008 | Greenlaw |
| 2008/0152003 A1 | 6/2008 | Oguz |
| 2008/0152006 A1 | 6/2008 | Chen et al. |

FOREIGN PATENT DOCUMENTS

| | | |
|---|---|---|
| RU | 2324302 | 5/2008 |
| WO | WO03036622 | 5/2003 |

OTHER PUBLICATIONS

Shanableh et al., "Syntax Friendly and Syntax Amendment Approaches to Error Resiliency in the MPEG-4 Simple Scalable Profile", Signal Processing: Image Communication 20, 2005, pp. 389-411.

Shanableh et al., "Amending the sytax of the MPEG-4 Simple Scalable Profile to use error resilience tools", International Conference on Visual Information Engineering, Guildford, UK, Jul. 7-9, 2003.

Tervo et al., "Improved Error Recovery in an X.25 Packet Receiver", Proceedings of IEEE Conference on Communication Computers and Signal Processing, May 19-21, 1993.

METHOD AND APPARATUS FOR SYNCHRONIZING HIGHLY COMPRESSED ENHANCEMENT LAYER DATA

This application is a continuation of co-pending U.S. application Ser. No. 12/737,408, filed Jan. 11, 2011, herein incorporated by reference.

FIELD OF THE INVENTION

This invention relates to a method and an apparatus for high compression encoding of enhancement layer data relating to base layer data, and a method and an apparatus for corresponding decoding of the highly compressed enhancement layer data, wherein synchronization between the enhancement layer data and the corresponding base layer data is determined.

BACKGROUND

Some multimedia application data formats use hierarchical layers, with a base layer (BL) and one or more enhancement layers (EL). Data within a layer are often packetized, i.e. organized in packets or frames. While the BL signal alone can be decoded to obtain reproducible multimedia data and comprises all information for a basic decoding, the EL signal comprises additional information that cannot be decoded alone to obtain useful multimedia data. Instead, the EL data are tightly coupled to the EL data, and are only useful together with them. Usually the BL and the EL data are added or superposed to each other, either for a common decoding or after their individual decoding. In either case it is necessary to synchronize the EL data to the BL data, since otherwise the EL data contain no useful information.

It is common to check the integrity of each sub bitstream individually, e.g. by individual CRC check sums or forward error correction (FEC) mechanisms. In general, such CRC or FEC schemes are applied to individual, separate blocks or signal frames of the sub bitstreams. If the decoding starts at synchronized positions in the sub bitstreams, and if in addition for none of the sub bitstreams transmission errors are detected, the decoder will assume that the hierarchical bitstream is in synchronization. However, because this technique does only give certainty regarding the reception of the individually protected blocks of a bitstream, there may still be undetected errors, e.g. if one of the protected blocks of one sub bitstream is completely lost.

Further, it is desirable to keep the data rate as low as possible, which leads to sophisticated data compression methods. A disadvantage of the CRC or FEC approach is that typically a fair amount of additional data has to be transmitted for each block of the bit stream. Therefore, variable length coding is often used for data words that are not equally distributed. In variable length coding (VLC), data words that appear more frequently, i.e. with higher probability, are encoded into shorter code words, while data words that appear with lower probability are encoded into longer code words. Thus, the average amount of bits in encoded messages is shorter than using constant code word length. However, high compression methods such as VLC are more sensitive to bit errors, which may lead to complete data loss. E.g. for VLC it may be impossible to determine which bits belong to a code word when synchronization has been lost. Therefore a common solution to limit possible data loss is the insertion of unique synchronization words that can be recognized with very high probability. However, synchronization words increase the data rate, and the more synchronization words are used, the higher is the data rate. Moreover, a further disadvantage of applying CRC or FEC methods on blocks of sub bitstreams is that it is very difficult to tackle blocks that have varying lengths and no block headers, like in VBR coding.

In order to enable the detection of bit errors in data transmission or storage, it is a common method to calculate a checksum over encoded data, and transmit or store also the checksum. Different types of checksums are known for detecting or for correcting certain bit errors. However, the higher the amount of information in the checksum is, the more bits it requires. Thus, the more useful a checksum is, the more it increases the data rate.

SUMMARY OF THE INVENTION

In view of the above, a problem to be solved by the present invention is to provide an encoding method and format for a highly compressed enhancement layer data stream that relates to a packetized base layer data stream, such that it is possible to at least detect synchronization loss between the enhancement layer data and the base layer data during decoding, while the amount of synchronization (sync) information and checksum information in the enhancement layer data stream is kept low.

Further, another problem to be solved by the present invention is to provide a corresponding decoding method and apparatus. In particular, the decoding method and apparatus should be able to at least detect synchronization loss between the enhancement layer data and the base layer data during the decoding. Upon such detecting, it should be able to at least assist in reducing the disturbance.

The present invention provides the following solutions for the above-described problems.

In principle, the invention is based on the recognition of the fact that packets that comprise variable length coded data typically provide free space in their padding bits, which can be used for adding checksum information, and that the checksum information can also be used for detecting synchronization loss or other synchronization purposes. For this reason, the checksum information refers to both decoded base layer and decoded enhancement layer packet data. Though not all packets provide free padding bits, at least most of the packets do, and on average each packet provides (n−1)/2 padding bits, assuming that n bits form a byte. Though this variable amount of bits per packet may be not sufficient for highly sophisticated error correction, it has been found to be sufficient for the above-mentioned synchronization related purposes. Advantageously, this allows e.g. out-of-sync detection after few packets even if the enhancement layer encoding provides very limited overhead information, e.g. no packet headers and no packet synchronization words.

In one aspect, the present invention provides a method for encoding a base layer data stream and a related enhancement layer data stream, comprising steps of
calculating a common checksum over the base layer data stream and the enhancement layer data stream,
encoding the base layer data in base layer packets of individual length, wherein the data words within a packet have constant length (e.g. a byte-oriented structure) and each packet has a header portion comprising at least a synchronization word and an indication of the individual packet length,
encoding the enhancement layer data in enhancement layer packets of individual length, wherein each enhancement layer packet corresponds to a particular base layer packet, and wherein the data words within an enhancement layer packet have variable length (i.e. not a byte-oriented structure) and the packets comprise no header, no leading packet sync word and no indication of the packet length, and wherein the number of enhancement layer data words encoded into a packet depends on the number of base layer data words encoded into the corresponding base layer packet, mapping the encoded enhancement layer packets to a byte-oriented structure, wherein a byte has n bits and wherein a number of padding bits in the last byte of the packet remain unused, the number being between zero and n−1, determining the number of padding bits for an enhancement layer packet, extracting an amount of least significant bits (LSBs) from the checksum related to said enhancement layer packet and its corresponding base layer packet, the amount being equal to said determined number of padding bits, and inserting the extracted checksum LSBs into said padding bits.

The length of the individual base layer packets may be defined by their contents, according to the employed multimedia application format. E.g. the audio coding format MP3 (MPEG-1 Layer III) or the video encoding format AVC provide variable, content-depending packet lengths.

Further, it is to be noted that the number of values in a packet (i.e. the information) is the same before and after entropy coding, while the number of bits or bytes usually differs.

In one embodiment, each base layer (BL) packet of the BL data stream has one corresponding enhancement layer (EL) packet of the EL bit stream, and each data value in the BL packet has a corresponding data enhancement value in the EL packet. E.g. if the BL packet has a particular number $X_B$ of values, the corresponding EL packet has the same number of enhancement values, one enhancement value for each of the respective BL values.

In another embodiment, wherein each BL packet of the BL data stream has one corresponding EL packet of the EL bit stream, each data value of only (a) particular type(s) in the BL packet has a corresponding data enhancement value in the EL packet. E.g. if a BL packet has $X_{B1}$ values of a first type and $X_{B2}$ values of a second type, the corresponding EL packet may have the same number $X_{B1}$ of enhancement values relating only to the BL values of the first type.

In one embodiment, the BL data and the EL data are arranged sequentially, e.g. stored within a single file, and the EL data comprise not more than one synchronization word.

According to another aspect of the invention, an encoded multimedia signal comprises a first portion and a second portion, the first portion comprising byte-aligned entropy encoded packets of a base layer audio bit stream, and the second portion comprising byte-aligned entropy encoded enhancement layer packets comprising variable length coded enhancement layer data, wherein the base layer packets comprise synchronization information and the enhancement layer packets do not comprise synchronization information (at least no packet headers), and wherein enhancement layer packets comprise encoded parameters being suitable for enhanced decoding of their corresponding base layer packets, and wherein the last byte of an enhancement layer packet comprises an individual variable number N of padding bits (i.e. different enhancement layer packets may have different individual numbers of padding bits). The padding bits comprise the N LSBs of a checksum over two packets, namely the enhancement layer packet from the second portion of the audio signal and the corresponding base layer packet from the first portion of the audio signal. The checksum was calculated before entropy encoding, i.e. it refers not to the data as received, but to the entropy decoded data.

According to yet another aspect of the invention, a method for decoding a base layer bit stream and a corresponding enhancement layer bit stream, wherein the enhancement layer bit stream comprises variable length coded enhancement data for enhanced decoding of the base layer bit stream, comprises steps of entropy decoding a portion of the base layer bit stream, wherein a first entropy decoded base layer packet is obtained, entropy decoding a portion of the enhancement layer bit stream, wherein the enhancement data for enhanced decoding of a portion of the base layer bit stream are obtained, determining a number N of padding bits in the last byte of the enhancement layer bit stream, and extracting and/or storing the padding bits, calculating a checksum over the first decoded base layer packet and said enhancement data from the entropy decoded portion of the enhancement layer bit stream, extracting the N least significant bits (LSBs) of the calculated checksum, N being equal to the determined number of padding bits, comparing the extracted N least significant bits of the calculated checksum with the N extracted padding bits, and if both are equal, decoding the base layer bit stream using said enhancement data and the base layer bit stream data, otherwise decoding the base layer bit stream using simplified decoding, wherein data from the enhancement layer bit stream are not used or ignored.

The length of a base layer packet (before or after decoding) may be predefined or indicated in its header, while the length (in terms of bits) of an enhancement layer packet is not indicated and must be derived during the decoding process, e.g. using information from the corresponding base layer packet. In one embodiment, the number of encoded values in the enhancement layer packet is equal to the number of a pre-defined type of values in the corresponding base layer packet, and the decoding comprises steps of determining from the base layer packet the number of values to be decoded from the enhancement layer packet, and decoding from the enhancement layer data the determined number of values. In another embodiment, the number of values per enhancement layer packet is pre-defined.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of a stream format with base layer and enhancement layer.

DETAILED DESCRIPTION OF THE INVENTION

Figure 1:
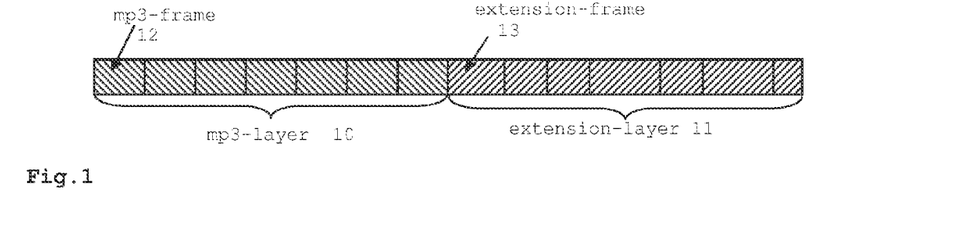

FIG. 1 shows a data stream comprising a base layer 10 and an enhancement layer 11. The enhancement layer is also called extension layer herein. Since the data stream is limited, it is also referred to as a data chunk. The extension layer is in the described and depicted embodiment subsequent to the base layer, so that both can sequentially use the same channel for transmission or storage. In another embodiment, both layers can use separate channels, so that they can simultaneously be transmitted, received, stored or read from storage.

Figure 2:
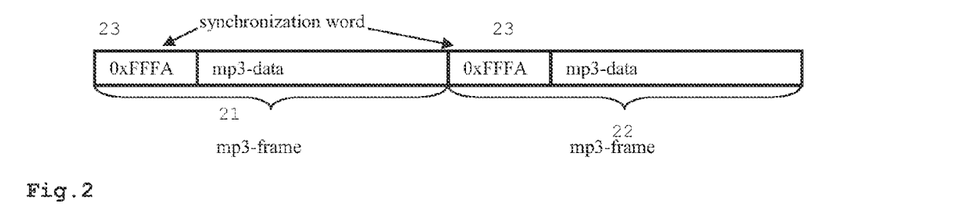
FIG. 2 the structure of a packetized base layer.

In this example, the base layer 10 contains MP3 audio data, as shown in FIG. 2, and the enhancement layer 11 contains data for enhanced decoding of the audio data. The base layer data chunk is separated into frames 12, 21, 22. The start of a base layer frame, e.g. MP3 frame, is indicated by a unique synchronization word 23. A corresponding decoder, e.g. an MP3 decoder, parses the data stream for this synchronization word 23 until it finds an MP3 frame start, and decodes the spectral values of the found MP3 frame. If a bit error exists within the frame data, the decoded data are wrong and the frame 21 is dropped. The next frame 22 however can be found by the next synchronization word and decoding can continue, so that no further frames are lost.

The invention is explained based on a format and a decoding process used for enhanced MP3 audio data. The decoder is referred to as "hd3" decoder, and the corresponding encoder as "hd3" encoder. Alternatively, it may be called "MP3HD". The so-called "hd3" bit-stream format comprises an MP3 formatted layer as base layer 10 and at least one additional enhancement layer or extension layer 11. The MP3 frames 12 form one coherent data chunk 10 of an hd3-file, and the extension layer 11 forms a following coherent enhancement data chunk. In one embodiment the base layer 10 and the extension layer 11 form a complete audio track (or the like). In another embodiment it is possible for exceptionally long tracks that a coherent base layer data chunk and the following coherent enhancement layer data chunk form only a part of a track, and the complete audio track consists of two or more pairs of data chunks.

Figure 3:
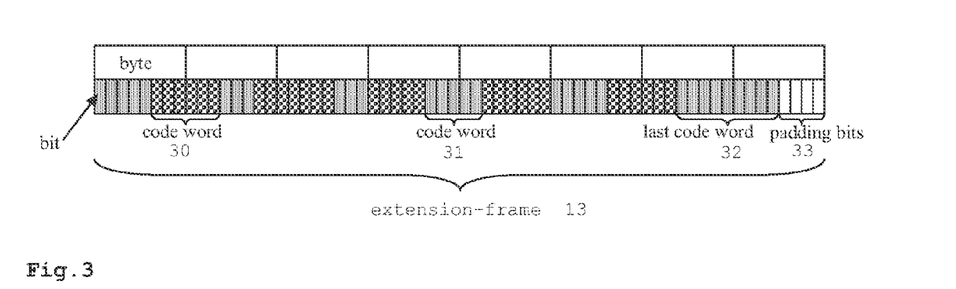
FIG. 3 the structure of a packetized enhancement layer including padding bits.

The extension layer data chunk 11 is also structured in frames, as shown in FIG. 3. However, in order to reduce bandwidth, it is highly compressed. The enhancement layer values are therefore encoded using variable length coding, and the extension layer frames do not start with a sync word (synchronization word). Instead, the frames are just appended in a sequence. Further, the code words within enhancement layer frames are just appended in a sequence, regardless of byte structures. Thus, the frame borders of the extension layer are not directly detectable, but must be found according to a defined decoding algorithm, which comprises decoding a defined number of values per frame.

Due to the variable length coding, a bit error will not only disturb the current value, but it will also render the length of the current value unknown, so that the beginning of all following values in the frame is uncertain. Further, due to the missing frame synchronization words, it would not be possible conventionally to identify further frames within the enhancement layer data chunk.

Exemplarily, Golomb code can be used as variable length code. Golomb code can be used for representing a limited range of non-negative integer values, which is sufficient e.g. for MP3 data and MP3 enhancement data. In principle the code can also be used for other multimedia data. A code word is constructed by a quotient and a divisional remainder, with the quotient in unary representation and the remainder in binary representation and both referring to the same divisor. E.g. with a divisor of eight, the value twenty-one is represented as "11 0 101": the leading "11" represents the quotient (two) in unary representation, the following zero is a separator and the last bits "101" represent the remainder of five. Since the number of bits of the remainder depends on the pre-defined divisor, it is fixed. However, if the leading unary code or the separator is distorted due to a bit error, it is impossible to determine the code word length. Thus, also following code words are not found. This kind of problem applies to all variable length codes similarly, so that the invention is also useful with other variable length codes.

As described above, one problem resulting from the encoding is that after a bit error the subsequent parts of the enhancement layer data stream cannot be used with prior art methods. Another, even worse problem is that this error is not detectable with prior art methods, so that the decoding will use wrong enhancement layer data. This will, e.g. in the case of audio data, disturb the audio reproduction, so that the decoded audio signal resulting from base layer data and non-synchronized enhancement layer data will be even worse than correctly decoded pure base layer data. In the general case, usage of wrongly synchronized enhancement layer data disturbs the usage of the—otherwise correct—base layer data.

According to the invention, one solution to this problem is provided as follows: due to the variable length coding of the enhancement layer data within a frame, and due to the fact that the variable length coded data are mapped to a byte structure for subsequent processing, the last byte of the enhancement layer frame may contain padding bits. These are usually set to zero and ignored. Further, the amount of padding bits varies from frame to frame, since frames may have different bit lengths due to the variable length code. The present invention comprises calculating before the entropy encoding a common checksum over the base layer frame and its corresponding enhancement layer frame, and writing as many as possible bits, preferably LSBs, of the checksum into the padding bits that remain after the entropy encoding. While conventional decoders will not be able to use this information and therefore ignore it, a decoder according to the decoding aspect of the present invention uses this information for at least detecting whether a base layer frame and an enhancement layer frame are synchronized.

According to one aspect of the invention, a decoder decodes a defined number of values from the enhancement layer data for each packet, starting from a defined start position. Then the decoder reads the remaining spare bits from the last byte of the current enhancement layer frame, which are usually set to zero. In the enhancement layer frame according to the invention however these bits contain the LSBs of the checksum. Therefore the decoder extracts/stores these bits, calculates a checksum over the decoded base layer frame and the current decoded enhancement layer frame, and compares the extracted/stored checksum with the appropriate amount of LSBs of the calculated checksum. If both checksum values are equal, it is assumed that the base layer frame and the enhancement layer frame have been correctly decoded and belong to each other, i.e. the streams are synchronous.

In an advanced embodiment, it may also be possible to regain synchronization after a synchronization error has been detected. This would be possible e.g. by decoding after sync loss a subsequent BL frame, decoding the defined amount of values from the EL frame, extracting from the last byte of the EL frame the remaining bits, calculating a checksum over the decoded BL and EL frame and comparing the checksum with the extracted padding bits. In the case of a mismatch, the start position in the EL is shifted bitwise, and the EL related procedure is repeated. If there are no bit errors in the corresponding BL and EL frames, it is possible with this method to find these frames in the stream, and thus re-synchronize. In one embodiment the described process is used to repair a damaged enhancement layer stream in a post-processing step. For this purpose, a bit error in an EL packet is detected as described previously, the next correct EL packet is determined as described above, and the erroneous EL packet is modified so as to fulfil the format requirements. In another embodiment where the enhancement layer frames are more reliable than the base layer frames (e.g. error-free due to higher quality reception conditions), the corresponding BL packet for a given EL packet may be determined or repaired.

As described above, the correct decoding of the enhancement frame data ensures that the base layer and the enhancement layer can be synchronized. In the below-described MP3 related embodiment, the decoder is a partial extension layer decoder. Decoding of the enhancement layer starts at a defined position in the data chunk or file, namely after the last frame of the base layer data. The start of the enhancement layer data may be trivial to find, e.g. if it is in a separate file or stream. In the case of a single file or channel for base layer and enhancement layer, a pointer pointing to this position may be provided in the file header. A further possibility is that the enhancement layer chunk 11 starts with a special indication (e.g. a particular synchronization word). However, the enhancement layer has no further additional bytes for synchronization purpose.

In the embodiment, representing e.g. a hd3 codec, a bit exact entropy coding algorithm is used. This algorithm uses variable code word lengths, adapting the length of a code word to the statistical frequency of occurrence of the symbol. Therefore the frame length of each frame, in terms of bits, varies and does not end directly at a byte boundary. To allow byte-wise cutting of the extension layer or jumping to a particular extension frame start (which may be known e.g. from a table stored in the file header) the frame length is always rounded up to the next byte boundary by using padding bits. Thus, an average amount of 3.5 padding bits (assuming that each byte has eight bits) per frame occurs, and can be used according to the invention. Generally, it will be $(k-1)/2$ bits if a byte has k bits.

As mentioned above, a problem for this kind of bit streams is that an error within the bit stream will not only lead to errors in the current frame, but it will also disturb the synchronization. Moreover, in the above-described hierarchical MP3 bit stream formats the extension layer has to be synchronized with the base layer, because the extension layer frame needs the partially decoded values of its specific MP3 frame to reconstruct the encoded signal. Therefore, for keeping the extension layer synchronized, it must be assured that the MP3 frames and the extension layer frames are synchronized, and that the partial decoding of the extension layer is correct.

One advantage of the invention is that it achieves both synchronization issues without using any extra bits or bytes, i.e. without increasing the amount of data.

Exemplarily, an implementation of an Out-Of-Sync detection in an hd3 decoder is described below. First, for ensuring that the decoded MP3 data (spectral MP3 values) are valid, the integer sum of the partially decoded MP3 values is computed. Secondly, for verifying the correct decoding of the extension layer data, the integer sum of the partially decoded extension layer data is computed, and added to the integer sum of the partially decoded MP3 values. The result is in principle a hash value of the two corresponding hd3 frames. The hash value is identically bit exact on every encoding and decoding device, independent from the actual device and independent from the actual entropy encoding method, since it was calculated before entropy encoding. By receiving the hash value within the bit-stream, decoders can detect synchronization errors and react on it. Though different entropy coding methods may result in different enhancement layer frame lengths, and thus different amounts of padding bits, the checksum is the same. Further, the decoder is still able to detect sync loss, since the amount of bits to be compared is determined within the decoder.

One aspect of the invention is to use only the LSBs of the hash value and store these bits in the padding bits of each extension layer frame. The decoder can then after partially (i.e. entropy) decoding both layers extract the padding bits and compute the hash value from the partially decoded values. If the LSBs of the hash value are not equal to the padding bits, there was an error in the partial decoding processes and the extension layer may get out of synchronization by further decoding. As a consequence, the decoder can in one embodiment stop the whole decoding process. In another embodiment however, the decoder switches to stand alone decoding of the base layer frames, because decoding of the base layer chunk is still feasible. It may then continue with pure base layer decoding, and may either suppress enhancement layer decoding or try to regain synchronization of the enhancement layer, as described above. A particular advantage of this procedure is that wrongly synchronized enhancement layer data can be detected and switched off, and thus do not disturb reproduction of the base layer data.

Figure 4:
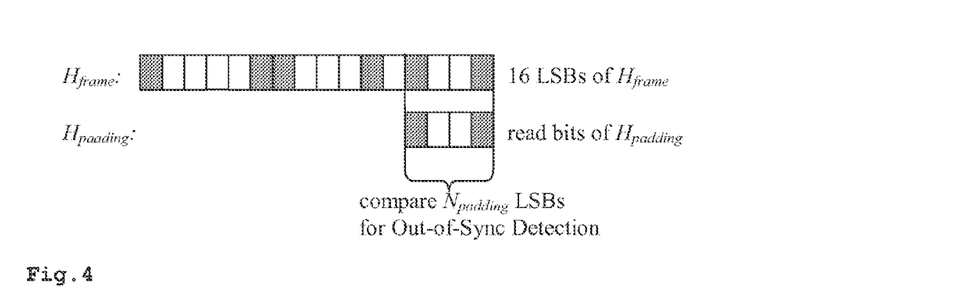
FIG. 4 comparison of exemplary received and calculated sync words for out-of-sync detection.

In the following, a comparison of exemplary received and calculated sync words is described, as shown in FIG. 4. The following terms are used:
$X_{mp3}(k) \triangleq$ partial decoded mp3 value
$X_{ext}(k) \triangleq$ partial decoded extension value
$H_{padding} \triangleq$ read padding bits
$N_{padding} \triangleq$ number of padding bits used $$H_{frame} = \sum_K X_{mp3}(k) + \sum_K X_{ext}(k)$$

$\triangleq$ computed hash value from partial decoded values

In the example, a 16-bit checksum $H_{frame}$ is calculated in a decoder over the values $X_{mp3}(k)$ of a partially decoded base layer frame and the values $X_{ext}(k)$ of its corresponding enhancement layer frame. Four bits are detected as padding bits in the last byte of the received enhancement layer frame, and the transmitted 4-bit checksum $H_{padding}$ is extracted from these padding bits. For detecting correct synchronization, the extracted padding bits $H_{padding}$ must be equal to the LSBs of the calculated checksum $H_{frame}$. If they are different, this means that the frames are out-of-sync (or a bit error has occurred, which can thus also be checked).

One aspect of the invention is that no additional data bytes need to be inserted in the enhancement layer stream. Consequently, other than in known error detection methods, the number of padding bits differs between zero and seven bits, so that the error detection probability differs as well. Therefore a loss of synchronization might be not detected immediately at the first invalid frame. However, each following frame increases the probability of the error being detected, because the following hash values will be invalid as well. Thus, the proposed method is good enough to detect out-of-sync situations at least within few frames. In audio related embodiments, such situations will be detected fast enough to prevent major disturbance of the listener, taking into account that MP3 frames typically represent some milliseconds of sound. Therefore the proposed out-of-sync detection is particularly advantageous for audio coding.

Figure 5:
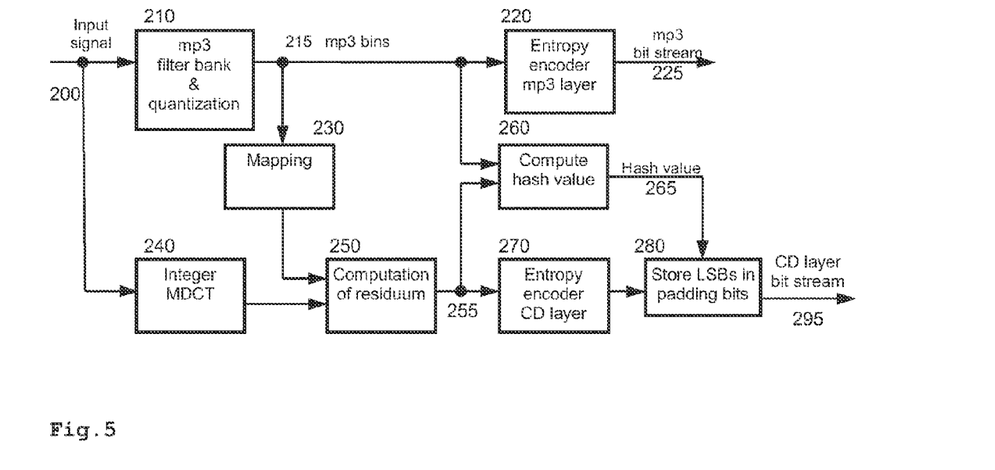
FIG. 5 a block diagram of an audio encoder for generating MP3 base layer data and audio enhancement layer data.
Figure 6:
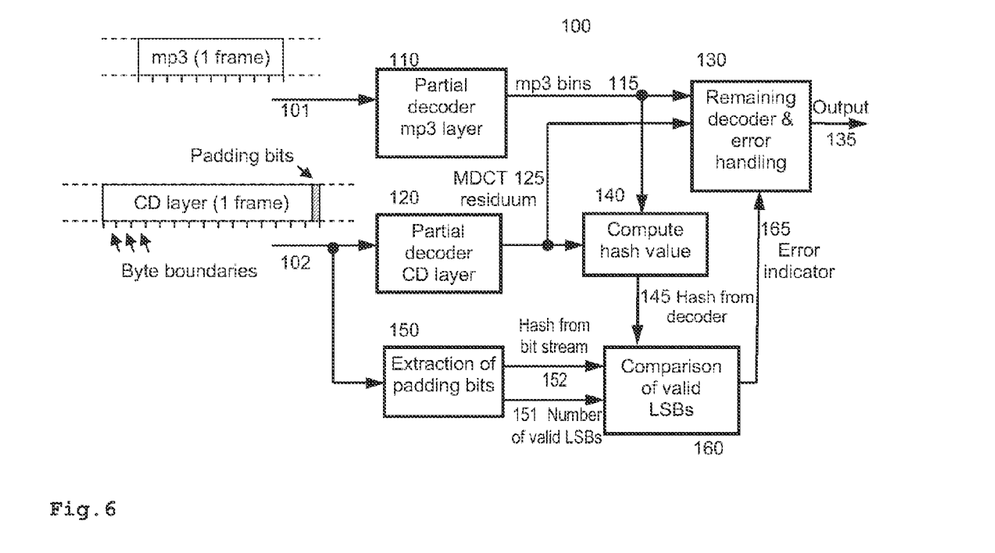
FIG. 6 a block diagram of an audio decoder for MP3 base layer data and audio enhancement layer data.

In further embodiments of the invention, the described out-of-sync detection mechanism is implemented an MP3 based hierarchical lossless audio codec, as shown in FIGS. 5 and 6.

Figure 7:
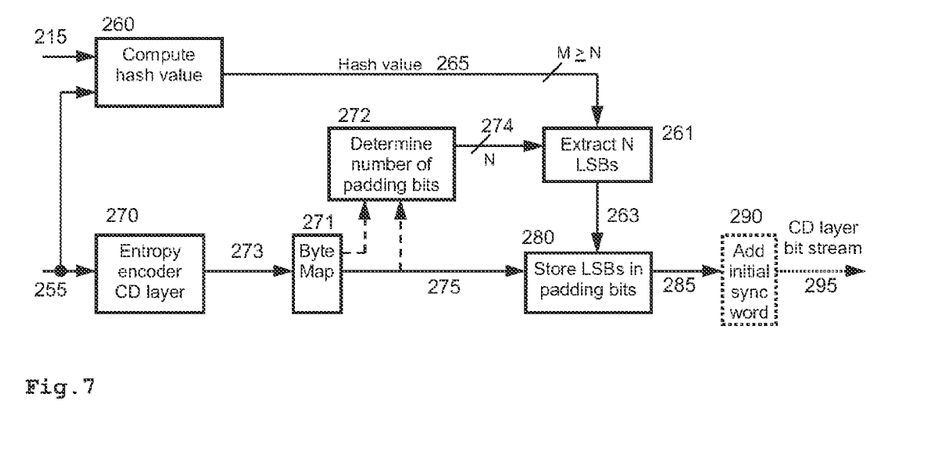
FIG. 7 a detail block diagram of the padding bit replacement in the audio encoder.

FIG. 5 shows an exemplary audio encoder for generating MP3 base layer data and audio enhancement layer data. An input signal 200 is fed to a conventional MP3 filter bank and quantization unit 203, and to an integer MDCT calculation unit 240. The MP3 filter bank provides MP3 bins 215, which are entropy encoded 220 and then represent a conventional MP3 formatted audio signal 225, i.e. an MP3 bit stream, which is output. An enhancement layer signal is obtained by a mapping 230 of the MP3 bins to Integer MDCT values. These are compared 250 with the outputs of the actual Integer MDCT 240, wherein a remaining residual 255 is computed 250. The residual 255 is entropy encoded 270, whereby variable length coding is used as described above and shown in FIG. 3. FIG. 7 shows in more detail that the variable length coded packet 273 is mapped 271 to bytes. Most of such encoded packets 275 will have trailing padding bits, as explained above, which may temporarily be set to zero. It is advisable to determine 272 the number N of padding bits here.

In a computation block 260, a hash value 265 is computed over the MP3 bins 215 of a base layer frame and the residual 255 of the corresponding enhancement layer frame. These two corresponding frames have been generated both from the same portion of the input signal, and therefore both need to be combined in an advanced decoder into the same portion of an output signal. Conventional decoders however can ignore the enhancement layer signal, and decode only the base layer signal into a conventional audio signal with MP3 quality. Also decoders that are capable of decoding the enhancement layer signal need not necessarily perform out-of-sync detection, but they can ignore the hash value. These decoders however run the risk of not being able to detect out-of-sync situations, and thus may provide worse output signal quality than a decoder according to the invention.

The hash value 265 is computed 260 from the integer spectra within the MP3 bins 215 and the integer residuals 255, like it will later in the decoder be computed from the decoded integer spectra. The hash value 265 may be a simple checksum over these integer values, and will during its calculation usually have a fixed width of M bit (M≥N). In principle, the determined amount N 274 of available padding bits at the end of an enhancement layer frame is provided to a truncation unit 261 that extracts or truncates the N least significant bits from the M bit hash value 265. The resulting truncated N bit hash value 263 is then inserted 280 into the padding bits of the enhancement layer frame 275, whereby an entropy encoded enhancement layer signal 285 according to one aspect of the invention is obtained. The enhancement layer bit stream is also called "CD layer" bit stream herein, since it allows lossless reconstruction of the original quality (as from a CD) from the quality-reduced MP3 signal.

In one embodiment, a single initial synchronization word is added 290 to the enhancement layer bit stream 295. This may be advantageous in cases where the beginning of this stream may be difficult to find: e.g. if both layers are stored in a single file, as in FIG. 1, and a pointer in the file header points to the first enhancement layer packet, a bit error in this pointer would result in the enhancement layer not being found. With such single initial sync word it is possible to parse the stream for the enhancement layer start. However, it only provides initial synchronization, and is not suitable for detecting later synchronization loss between the layers.

It is clear that in implementations several of the described logical steps can be performed simultaneously so that intermediate results may be not physically available.

FIG. 6 shows a corresponding decoder for decoding base layer frames and enhancement layer frames while performing out-of-sync detection. The decoder receives two separate bit streams, e.g. an MP3 bit stream 101 and an enhancement layer bit stream 102. Both bit streams are then partially decoded 110,120, i.e. entropy decoded. The term "partial" decoding refers to the fact that the result of this decoding is not the intended final audio signal. Instead, the results of the partial decoding are the decoded MP3 bins 115 for the MP3 bit stream and decoded integer MDCT residuum bins 125 for the enhancement layer, respectively. The integer MDCT residuum bins 125 can be used to enhance the MP3 bins, so that the original audio values as they were before the (lossy) MP3 encoding are obtained. Thus, with the enhancement layer data it is possible to obtain a lossless encoding of audio data, based on the lossy MP3 data.

Both partially decoded bit streams 115,125 are represented as integer values. For synchronization error detection 160, a single hash value 145 is computed 140 from the results 115, 125 of the two partial decoders 110,120. In the current example, the hash value 145 is calculated by simply adding the integer sum of all frequency bins from the MP3 spectrum plus all frequency bins from the Integer MDCT residuum spectrum. If the signal spectrum is non-zero, as is usually the case, the truncated hash value in the few least significant bits (LSBs) of this sum represents a pseudo-random value that is reasonably uncorrelated from frame to frame. In other embodiments other methods to calculate a hash can be used, e.g. adding only certain values, or using CRC-like methods based on linear feedback shift registers.

In parallel, the padding bits that conclude the encoded sub bit stream of the enhancement layer representation are extracted 150. Along with the extracted padding bits 152, the number of detected padding bits 151 is forwarded to the next processing step.

The actual error check is done comparing 160 the LSBs of the hash value 152 taken from the enhancement layer sub bit stream 102 with the corresponding LSBs of the hash value 145 computed from the locally decoded spectra 115,125. If the comparison indicates a difference, an error indication flag 165 is raised in order to signal out-of-sync to the final decoding block 130.

The remaining final decoding 130 combines the two partially decoded signal spectra, i.e. the MP3 bins 115 and the MDCT residuum 125, and produces the audio output signal 135 of the decoder. If the error indication flag 165 has been raised as described above, the decoder takes appropriate measures to tackle the out-of-sync situation. For example, the decoding process may be stopped altogether, or the decoder may fall into a mode of decoding of the base layer only, thereby neglecting the unsynchronized information from the enhancement layer.

Preferably, the invention relates to hierarchical or scalable audio compression. In particular, the invention is advantageous for bit stream formats in which the different layers of a hierarchical bit stream are transmitted via different transport channels or stored in separate physical locations. E.g. the invention is beneficial if at least large portions of the sub bit streams of a hierarchical encoded audio signal are stored in different locations in a file, or where during transport or retrieving from storage the different sub bit streams may get out of synchronization due to transmission or storage errors. The invention enables a guaranteed detection of such situation within a short time, and enables taking appropriate measures.

The present invention has advantages over other known solutions to the synchronization problem. E.g. it is not necessary to continuously send synchronization patterns or time stamps with the blocks of the enhancement layer sub bitstream, so that no additional data need to be transmitted.

For the base layer however it may be required to send synchronization patterns along with each block or signal frame of the bit stream, as e.g. in MPEG-1 layer III (MP3) where each frame header starts with fixed patterns of twelve digital ones. This pattern, together with a validity check of the following header information, allows keeping the decoder synchronized to one bit stream. However, synchronization of different sub bit streams cannot be achieved by using a fixed synchronization pattern. The invention solves this problem generally by calculating a CRC or hash value from temporally corresponding frames of an upper layer and lower layers. Thereby, a strong link is constructed between said upper layer and all the lower layers that contribute to a common decoding.

Another advantage of the invention is that the CRC or hash value is computed from individual partially decoded information coming from the sub bit streams, in contrast to the conventional manner to compute/check CRC values over an encoded bit stream. This reflects a different mindset: typically, CRCs are applied to protect transmission/storage of bits, while here we apply CRC/hash values in order to protect bit-exact transmission/storage/decoding of integer parameters. Another advantage of the invention is that the extra information required to transmit said CRC/hash value is stored within the padding bits that are appended at each frame boundary in order to start the following frame at byte boundary. Though the amount of available padding bits is variable and not predictable, it is sufficient to provide on average a short reaction time for out-of-sync detection.

A further advantage is that the error check encompasses parts of the decoding process. That is, in addition to just checking that the bit streams are aligned, it also checks that the partial decoding processes are bit exact, i.e. bit level synchronous.

The invention has also the following advantages:
It can be applied with variable-bit-rate encoding schemes without a need for synchronization patterns. Therefore, it obtains very high compression efficiency.
No extra bit rate is required due to storing the CRC/hash information in the padding bits for each frame.
With the invention, it is not required to continuously track synchronization or correct reception of all sub bit streams. The error check can be computed independently for each signal frame.

Though the above examples relate to audio signals, the general idea of the invention is applicable generally to hierarchical bit streams representing various kinds of signals, e.g. video. Likewise, it is possible to apply the invention for further enhancement layer streams that need to be synchronized with either the base layer stream or other enhancement layer streams (e.g. a $2^{nd}$ EL stream may be synchronized to a $1^{st}$ EL stream, or each of them may be synchronized to the BL stream). Moreover, it is possible to apply the invention to detect synchronization between three or more streams simultaneously.

In one aspect of the invention, an apparatus for encoding an audio or video signal having a BL bit stream and an enhancement layer bit stream relating to the BL bit stream, wherein the BL data and the enhancement layer data are structured in packets, and wherein packets of the BL bit stream have corresponding packets of the EL bit stream, comprises calculating means for calculating a checksum over a packet of the BL bit stream and a corresponding packet of the EL bit stream, BL entropy encoder for entropy encoding the packet of the BL bit stream, wherein an entropy encoded, byte-aligned BL packet starting with a sync word is generated, EL entropy encoder for entropy encoding the packet of the EL bit stream using a variable length encoding method, wherein an entropy encoded EL packet is generated that has no header and does not start with a sync word, mapping means for mapping the encoded EL packet to bytes, each byte having a fixed number of bits, wherein in the last byte of the encoded EL packet a number N of bits are padding bits, determining means for determining the amount N of the padding bits within the last byte of the encoded EL packet, extraction means for extracting the N least significant bits of said calculated checksum, N being equal to the determined amount of padding bits, insertion means for inserting the extracted N least significant bits of the calculated checksum into the padding bits at the end of the encoded packet, and means for providing or outputting the encoded EL packet including the inserted checksum bits, and the encoded BL packet.

In one aspect of the invention, the apparatus for encoding further comprises means for storing the encoded BL bitstream and the encoded EL bit stream in a file, wherein the BL packets are stored adjacent to each other in a first portion of the file and the EL packets are stored adjacent to each other in a subsequent second portion of the file.

In another aspect of the invention, an apparatus for decoding an audio or video signal having a BL bit stream and a corresponding EL bit stream, wherein the EL bit stream comprises variable length coded parameters for enhanced decoding of the BL bit stream, comprises BL partial decoder for partially decoding a portion of the BL bit stream, wherein a first decoded BL packet is generated, EL partial decoder for partially decoding a portion of the EL bit stream, wherein the decoding parameters for enhanced decoding of the BL bit stream are generated, means for determining a number N of padding bits in said portion of the EL bit stream, and means for extracting and/or storing the padding bits, calculation means for calculating a checksum over the first decoded BL packet and said decoding parameters from the partially decoded portion of the EL bit stream, comparison means for comparing the extracted N least significant bits of the calculated checksum, N being equal to the determined amount of padding bits, with the N extracted padding bits, and for providing an error indication if both are not equal, and decoding means for decoding the partially decoded BL bit stream, if the extracted N least significant bits of the calculated checksum and the N extracted padding bits are equal according to said error indication, wherein said decoding parameters for enhanced decoding of the BL bit stream are used, and for otherwise decoding the partially decoded BL bit stream using simplified decoding, wherein data from the EL bit stream are not used.

It will be understood that the present invention has been described purely by way of example, and modifications of detail can be made without departing from the scope of the invention.

Each feature disclosed in the description and (where appropriate) the claims and drawings may be provided independently or in any appropriate combination. Where appropriate, features may be implemented in hardware, software, or a combination of the two. Where applicable, connections may be implemented as wireless connections or wired, not necessarily direct or dedicated, connections. Reference numerals appearing in the claims are by way of illustration only and shall have no limiting effect on the scope of the claims.

The invention claimed is:

1. A non-transitory storage medium have recorded thereon a signal comprising a first portion and a second portion, the first portion comprising byte-aligned entropy encoded packets of a base layer audio/video bit stream, and the second portion comprising byte-aligned entropy encoded enhancement layer packets of an enhancement layer bit stream comprising variable length coded enhancement layer data, wherein the base layer packets comprise headers with synchronization information and the enhancement layer packets comprise no headers with synchronization information,
and wherein each enhancement layer packet comprises encoded parameters being suitable for enhanced decoding of a corresponding base layer packet,
and wherein the last byte of an enhancement layer packet comprises a number N of padding bits, the padding bits comprising the N LSBs of a checksum over the enhancement layer packet and the corresponding base layer packet before entropy encoding.

2. The medium according to claim 1, wherein the base layer audio/video bit stream and the enhancement layer bit stream comprise integer values, and the checksum is a sum of the integer values.

* * * * *